Oct. 26, 1954 L. C. STENNING 2,692,916

SYNCHRONIZING ARRANGEMENT FOR PULSE SIGNALING SYSTEMS

Filed Feb. 18, 1952

INVENTOR
Luis Charles Stenning
BY
ATTORNEY

Patented Oct. 26, 1954

2,692,916

UNITED STATES PATENT OFFICE 2,692,916

SYNCHRONIZING ARRANGEMENT FOR PULSE SIGNALING SYSTEMS

Luis Charles Stenning, Ealing, London, England, assignor to The General Electric Company Limited, London, England Application February 18, 1952, Serial No. 272,113

Claims priority, application Great Britain April 9, 1951

6 Claims. (Cl. 179—15)

Figures 1, 2:
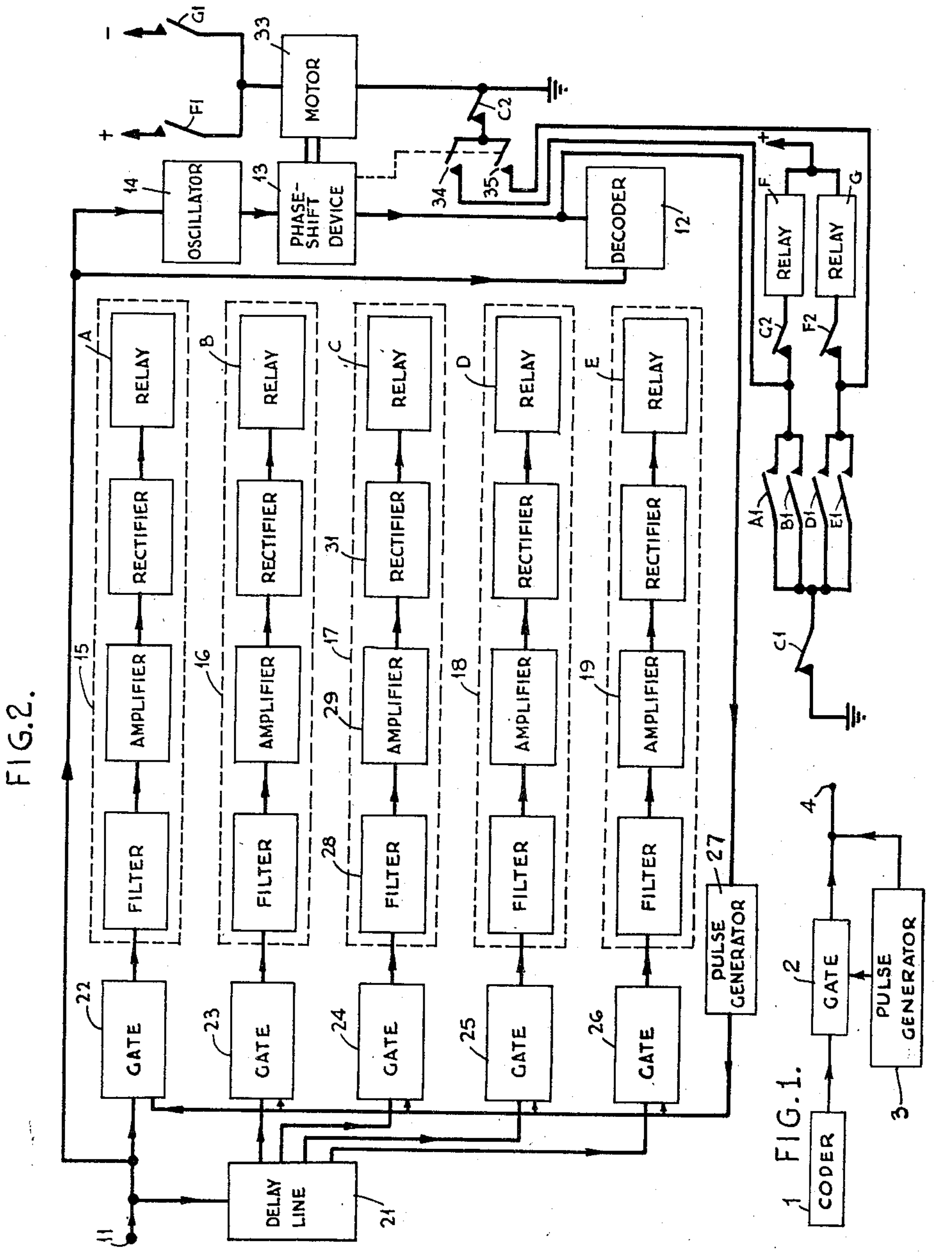

This invention relates to pulse signalling systems.

In pulse signalling systems which utilise pulse code modulation, intelligence may be transmitted merely by the presence or absence of pulses in regularly recurrent pulse time-positions. Alternatively the intelligence may be conveyed by transmitting either a positive or a negative pulse in each such pulse time-position, the nature of the intelligence determining the sign of each pulse. Thus, at the transmitting terminal, the signal to be transmitted may be periodically sampled and each sample represented by pulses in a group of a small number, for example five, pulse time-positions which approximately define the amplitude of the sample. At the receiving terminal it is necessary for the apparatus which decodes the pulse signal to be accurately synchronised in frequency with the coding apparatus at the transmitting terminal. Moreover it is necessary for the decoding apparatus to be accurately locked in time, that is to say correctly phased, with the coding apparatus.

Frequency synchronising of the receiving apparatus may be effected by having an oscillator loosely locked by the pulses of the receiver pulse code signal, there being arranged always to be sufficient pulses in this signal to synchronise the oscillator.

It will be appreciated that this requirement of effecting accurate time synchronisation between apparatus at the ends of a signalling path is not restricted to systems using pulse code modulation but also applies to any multi-channel pulse signalling system in which the several pulse signals carrying the intelligence of the several channels are combined in time multiplex. If the decoding or channel distributing apparatus, in the pulse code modulation case, or the channel distributing apparatus, in the other cases, slips one pulse interval (which in the case of pulse code modulation is synonymous with one position) with respect to the multiplex signal, no useful intelligence is transmitted over the system.

It is one object of the present invention to provide a system in which the correct relationship is maintained between the received pulse signal and apparatus to which the received signal is applied.

According to the present invention, there is arranged to be transmitted over a transmission path pulses in regularly recurring pulse intervals, which pulses define a characteristic modulation and are time multiplexed with the pulse intervals which convey the intelligence to be transmitted, and there is provided apparatus to which is arranged to be fed the pulse signal received over the said path, this apparatus including phasing means and at least three monitoring means to which are arranged to be fed the pulse signals occurring respectively in each of a group of adjacent pulse intervals which group is regularly recurrent in the received pulse signal, the group being determined by a signal supplied by the phasing means, the monitoring means all being responsive to the said characteristic modulation and the arrangement being such that, when the pulses having the characteristic modulation are fed to any one of the monitoring means other than a predetermined one which monitors a central pulse interval of the said group, the phasing means is adjusted to cause the pulses having the characteristic modulation to be supplied to the predetermined monitoring means.

Preferably the pulses which have the characteristic modulation are themselves identical with those that carry the intelligence to be transmitted over the system. That is to say, in a system which utilises pulse code modulation, the characteristic modulation is conveyed by pulses which have the same amplitude, wave-form and duration as those which carry the signal intelligence.

The phasing means may be formed by an oscillation generator associated with apparatus to which is arranged to be supplied the received pulse signal, the phase of the output of this generator being variable. This oscillation generator may comprise an oscillator in combination with a variable phase-shift device.

A 12-channel pulse signalling system in accordance with the present invention will now be described by way of example with reference to the two diagrammatic figures of the accompanying drawings. In the drawings, Figure 1 shows equipment at the transmitting terminal of the system while Figure 2 shows equipment at the receiving terminal of the system.

The signalling system uses pulse code modulation and the twelve signals to be transmitted are sampled in turn and the amplitude of each sample represented by a group of five time-positions at each of which there either is or is not a single pulse depending upon the particular sample amplitude. The frequency of recurrence of the pulse positions is 480 kilocycles per second and thus a particular pulse position of successive groups associated with a particular channel recurs at a frequency of $$\frac{480}{12\times 5}$$

i. e. 8 kilocycles per second.

It will be appreciated that with five pulse time-positions defining each sample amplitude, it is possible to distinguish between $2^5$ i. e. 32 different amplitude levels. Thus, including zero, amplitude levels in steps of one increment up to the level of 31 increments may be signalled. In the system being described, binary numerical coding is used and the first position in each group of time-positions corresponds to 16 increments, the next one to 8 increments, and so on to the fifth position which corresponds to one increment.

The last pulse time-position of the groups allocated to one channel and which would normally carry the single increment of information of successive samples are utilized in accordance with the invention to carry pulses defining a characteristic modulation for the purpose of checking the time synchronization of the received pulse signal and the decoding apparatus at the receiving terminal of the system. This, of course, degrades slightly the signal transmitted over that channel since each sample is represented by pulses at only four time-positions with the result that the number of different levels that can be signalled in respect of each such channel sample is reduced to sixteen. In other words, every other one of the thirty-two possible levels that could be signalled with the five time-position code is now omitted. At these pulse time-positions in the transmitted time-multiplex signal, there is alternatively a pulse and no pulse, the pulses themselves being exactly similar to, and therefore in themselves indistinguishable from, the normal signalling pulses. The pulses defining the characteristic modulation thus occur at a recurrence frequency of four kilocycles per second.

The apparatus for introducing the pulses having the characteristic modulation into the transmitted signal is shown in Figure 1. Referring now to that figure, a coding apparatus 1 is arranged to supply a pulse code signal which carries the intelligence of the twelve channels to be signalled. Since the twelve signals to be transmitted are sampled in turn and each sample is represented by a group of five time-positions, there are a total of sixty pulse time-positions in the pulse code signal in each complete cycle of coding. It is required that pulses occurring at one of these sixty pulse time-positions shall be replaced by the pulses defining the characteristic modulation and the output from the coder 1 is therefore supplied to a gate 2 which is arranged to pass pulses occurring at fifty-nine of the sixty pulse time-positions but not to pass any pulses occurring at the remaining position. A gating signal consisting of pulses having a recurrence frequency of 8 kilocycles per second is supplied to the gate 2 by the pulse generator 3 for the purpose of suppressing pulses that occur at the appropriate time-positions. Another pulse signal supplied by the generator 3 is added to the signal passed by the gate 2, this signal supplied by the generator 3 consisting of pulses having a recurrence frequency of 4 kilocycles per second, these pulses being phased so that they occur at alternate time-positions when the gate 2 is non-conducting. The required pulse code signal containing the pulses having the characteristic modulation is thus developed at the terminal 4, and this signal is transmitted, for example over a radio link, to the receiving terminal of the system.

Referring now to Figure 2, the received pulse code signal, if necessary after demodulation, is supplied to a terminal 11. This pulse code signal has the same wave-form as the signal at the terminal 4 in Figure 1 and is fed to decoding apparatus 12, the phase of operation of which is determined by the phase of oscillations suppled through a variable phase-shift device 13 by an oscillator 14. The frequency of operation of the oscillator 14 is locked by the pulse code signal supplied to the terminal 11.

Five monitors 15 to 19 are arranged to monitor the received pulse code signal and are arranged to be responsive to pulses having the characteristic modulation occurring at the monitored pulse time-positions. Each of the monitors 15 to 19 is supplied with the pulse signal consisting of the pulses, if any, which occur at every sixtieth pulse time-position in the received signal and the five monitors 15 to 19 are in fact arranged to be supplied with such pulse signals derived from a group of five adjacent time-positions in the received signal. In other words, if the pulse time-positions are numbered consecutively from a suitable instant of time, pulses at the 1st, 61st, 121st . . . etc. constitute the pulse signal supplied to the monitor 19, pulses at the 2nd, 62nd, 122nd . . . etc. constitute the pulse signal supplied to the monitor 18, pulses at the 3rd, 63rd, 123rd . . . etc. constitute the pulse signal supplied to the monitor 17 and so on.

In order to obtain these five pulse signals, the received pulse code signal is supplied to a delay line 21 and the received signal is supplied to a gate 22 while four signals derived from tappings on the delay line 21 are supplied to gates 23 to 26. These five signals supplied to the gates 22 to 26 have the same pulse code intelligence but are successively delayed by a period equal to the period between two adjacent time-positions in the received pulse code signals. A common gating signal is supplied by a pulse generator 27 to the five gates 22 to 26 so that each of the gates 22 to 26 is arranged to pass the component of the received signal which occurs at every sixtieth pulse time-position. The pulse generator 27 is synchronised in time by the oscillations supplied by the device 13 so that, by adjusting the phase-shift introduced by the device 13, the group of pulse time-positions that is monitored may be varied. The gates 22 to 26 thus pass the pulse signals occurring in a group of adjacent time-positions in the received signal to the monitors 15 to 19 respectively.

Considering now the monitor 17, for example, the signal passed by the gate 24 is fed through a band pass filter 28 to an amplifier 29, the filter 28 being adapted to pass oscillations having a frequency of 4 kilocycles per second. The output from the amplifier 29 is rectified by means of a rectifier 31 and the resulting direct current is supplied to a relay C.

It will be appreciated that if the component signal passed by the gate 24 consists of the pulses having the characteristic modulation, a signal will be passed by the filted 28 since the pulses having the characteristic modulation occur at a recurrence frequency of 4 kilocycles per second. If such a signal is passed by the gate 24 it is arranged so that the output from the rectifier 31 causes the relay C to be operated. If, however, the signal removed from the received signal by the gate 24 does not consist of pulses having the characteristic modulation, pulses would be passed by the gate 24 in a random manner so that little, if any, signal will be passed by the filter 28 and the relay C would not then be operated. Similarly, if pulses having the characteristic modulation are removed from the received signal by the gate 22, 23, 25 or 26, the associated relay A, B, D or E is caused to be operated.

The pulse signal consisting of the pulses having the characteristic modulation is required, during normal operation of the arrangement being described, to be supplied to the monitor 17 and it will be realised that the one of the gates 22 to 26 through which this signal is passed depends upon the relative phasing of the received pulse code signal and the oscillations supplied by the phase-shift device 13. When the pulses having the characteristic modulation are supplied to the monitor 17 the oscillations passed by the device 13 are phased so that the operation of the decoding apparatus 12 is then correctly timed to decode the received pulse code signal.

If now the output from the phase-shift device 13 and the received pulse code signal are not correctly phased, the phase-shift introduced by the device 13 is arranged to be controlled to restore the desired phasing. The device 13 may for example comprise a pair of crossed loops, that is to say a pair of coils, which lie in planes that are mutually at right angles, while a pick-up coil is located within the crossed loops. The crossed loops are arranged to be supplied with two oscillations respectively which are in phase quadrature and which are supplied by or are derived from the oscillator 14. This pick-up coil is mounted for rotation through 360° and it will be realised that the phase of the signal picked up by this coil is dependent upon the angular position of the coil relative to the crossed loops. The pick-up coil is arranged to be turned in either direction by a reversible electric motor 33.

Operation of the motor 33 in the two directions is controlled by contacts F1 and G1 of two relays F and G. The normally-closed contacts C1 are connected in the operating circuit of the relays F and G so that when the pulses having the characteristic modulation are supplied to the monitor 17 the operating circuit of the relays F and G are broken. When the pulses having the characteristic modulation are not passed to the monitor 17, the contacts C1 are closed and if these pulses are then being supplied to any one of the monitors 15, 16, 18 or 19 the appropriate one of the relays A, B, D or T is operated. If the relay A or B is operated the operating circuit of the relay F is completed through the contacts A1 or B1 and the normally-closed contacts G2 so that the contacts F1 are closed and the motor 33 is driven in the correct direction to bring the oscillation passed by the device 13 into the desired phase relationship with the received pulse code signal. Similarly if either of the relays D or E is operated the operating circuit of the relay G is completed and the contacts G1 are closed to drive the motor 33 in the other direction. If either the relay A or the relay E is operated, the received signal and the decoding apparatus 12 are two pulse time-positions out of register so that the pick-up coil of the device 13 must then make two complete revolutions to restore the situation.

While the pulse signal having the characteristic modulation is being brought back to the monitor 17 it will be realised that instants may occur when no one of the relays A, B, C, D or E is operated and accordingly a holding circuit for the relays F and G is provided through contacts 34 and 35 which are arranged to be closed while the pick-up coil of the device 13 is being rotated by the motor 33. When, however, the output from the device 13 and the received pulse code signal are in the desired phase relationship, the relay C is again operated so that the normally-closed contacts C2 are broken, whereupon the holding circuit of whichever one of the relays F or G is operated is broken so that the motor 33 stops. The contacts marked C2 may, instead of being contacts of the relay C, be a pair of contacts which are normally open but which are closed, for example by a cam, when the motor 33 shifts the phase-shift device 13 off normal. In that case the holding circuit is broken whenever the device 13 has introduced a phase-shift of 360 electrical degrees in the oscillations supplied to the decoding apparatus 12.

The arrangement described above ensures that if the received pulse code signal slips one or two pulse time-positions either forward or backward, the timing oscillations supplied to the decoding apparatus 12 is automatically phased so that the apparatus 12 operates correctly.

For initially setting up the decoding apparatus a timing signal as described in the specification of co-pending United States patent application Serial No. 272,114 may be transmitted. Moreover, if a slip of more than two time-positions has occurred so that pulses having the characteristic modulation are not supplied to any one of the five monitors 15 to 19, the apparatus may be resynchronised by causing such a timing signal to be transmited again. An alarm signal may therefore be sent back to the transmitting terminal of the system, over a suitable channel, for example an engineer's or operator's channel of a similar multi-channel signalling system operating in the other direction or alternatively one of the main channels of that other system may be seized temporarily and the alarm signal transmitted over it. For this purpose, the operating circuit of a device for producing the alarm signal may contain additional normally-closed contacts of the five relays A, B, C, D and E, these contacts being connected in series.

Instead of using the fifth pulse time-position in every group allocated to a particular channel, the same effect may be obtained by using that position in, say, every fourth such group. This will, of course, result in less degradation of the intelligence transmitted over that channel.

The invention is not restricted to signalling systems which utilise pulse code modulation and may for example be applied to systems using pulse time modulation (sometimes referred to as pulse phase modulation). In such a system, modulation is effected by varying the instance at which pulses occur in regularly recurrent pulse intervals and periodically recurring pulses in the transmitted signal may have a characteristic modulation which is arranged to be monitored at the receiving terminal of the system so as to ensure that apparatus to which the pulse signal is supplied at that terminal is correctly phased.

I claim:

1. A pulse signalling system comprising a receiving terminal and a transmitting terminal for transmitting a pulse signal to the receiving terminal, the transmitting terminal comprising means to generate a pulse signal carrying the intelligence to be signalled over the system, means to generate a pulse synchronizing signal and means to combine in time multiplex the pulse signal carrying said intelligence and the synchronizing signal to form the transmitted pulse signal in which the synchronizing signal consists of pulses having a characteristic modulation in pulse intervals that are regularly recurrent at a predetermined frequency, and the receiving terminal comprising at least three gates to separate from the received pulse signal component signals consisting of pulses in pulse intervals of the received signal that occur regularly at the said frequency, the pulse intervals of the pulses that make up the several component signals all being different but being adjacent to one another in the received signal so as to form a recurrent group in that signal, means to supply gating signals to the said gates, at least three monitoring means to which are passed the said component signals respectively and each of which is adapted to detect a pulse signal supplied thereto that consists of pulses having the characteristic modulation, and means dependent upon a component signal made up of pulses having the characteristic modulation being supplied to any one of said monitoring means other than a predetermined monitoring means to vary the timing of the gating signals so that the synchronizing signal is supplied to the said predetermined monitoring means, the predetermined monitoring means being one such that, when the synchronizing signal is supplied thereto component signals that consist of pulses occurring in pulse intervals on both sides of the pulse intervals of the synchronizing signal in the received signal are supplied to the other monitoring means.

2. A pulse signalling system according to claim 1 wherein the means to supply the gating signals comprises an oscillator in combination with a pulse generator.

3. A pulse signalling system according to claim 2 wherein the means to vary the timing of the gating signals comprises a variable phase shift device which is connected between the said oscillator and the said pulse generator while an electric motor is arranged to drive the phase shift device in dependence upon operation of the said relays.

4. A pulse signalling system according to claim 1 wherein, in the signal transmitted by the transmitting terminal, the pulses of the synchronizing signal are themselves identical with those that carry the intelligence to be transmitted over the system.

5. A pulse signalling system according to claim 4 wherein the system utilises pulse code modulation, the pulse code signal transmitted by the transmitting terminal having only two levels (for example pulse and no pulse), and the synchronizing signal consisting of those two levels occurring alternately in the appropriate pulse intervals in the transmitted pulse code signal.

6. A pulse signalling system according to claim 5 wherein each of the said monitoring means comprises a band pass filter, a rectifier arranged to be supplied with the signal passed by the filter and a relay, this filter being arranged to pass a signal having a frequency equal to one-half the said predetermined frequency so that when pulses having the characteristic modulation are fed to the monitoring means the said relay is operated.

No references cited.